(12) United States Patent
Haas et al.

(10) Patent No.: US 6,756,749 B2
(45) Date of Patent: Jun. 29, 2004

(54) MOTION CONTROL SYSTEM INCLUDING BOTH A STEPPER MOTOR AND A DC MOTOR

(75) Inventors: William Robert Haas, Fort Collins, CO (US); Kirk Tecu, Greeley, CO (US); David W. Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/057,342

(22) Filed: Jan. 23, 2002

(65) Prior Publication Data

US 2003/0137271 A1 Jul. 24, 2003

(51) Int. Cl.[7] .................................................. H02P 1/54
(52) U.S. Cl. ........................ 318/34; 318/685; 318/625; 318/732; 318/254; 318/139
(58) Field of Search ................................. 318/254, 560, 318/634, 439, 280, 34, 696, 685, 51, 53, 45, 798, 459

(56) References Cited

U.S. PATENT DOCUMENTS

| | | | | |
|---|---|---|---|---|
| 3,658,156 A | * | 4/1972 | Abbott ........................ 187/290 |
| 3,687,235 A | * | 8/1972 | Mitsui et al. ................ 187/296 |
| 4,030,006 A | * | 6/1977 | Elger .......................... 318/732 |
| 4,301,397 A | * | 11/1981 | Journey ....................... 318/625 |
| 4,635,205 A | * | 1/1987 | Eckert et al. ............... 705/410 |
| 5,528,114 A | * | 6/1996 | Tokizaki et al. ............... 318/67 |
| 5,627,438 A | * | 5/1997 | Barrett ........................ 318/139 |
| 5,633,568 A | * | 5/1997 | Dunfield ..................... 318/254 |
| 5,847,948 A | | 12/1998 | Gatto et al. |
| 5,880,537 A | * | 3/1999 | Windhorn .................... 307/64 |
| 6,053,833 A | * | 4/2000 | Masaki ......................... 475/2 |
| 6,081,091 A | * | 6/2000 | Mitchell et al. ............ 318/685 |
| 6,082,914 A | * | 7/2000 | Barrus et al. ............... 400/234 |
| 6,425,700 B1 | * | 7/2002 | Silverbrook et al. ........ 400/621 |
| 2001/0040706 A1 | | 11/2001 | Kirita |

FOREIGN PATENT DOCUMENTS

GB         1440300       6/1976
GB         2194693       3/1988

OTHER PUBLICATIONS

Torrens, Richard; "4QD–TEC: Electronics Circuits Reference Archive Stepper Motor As Encoder", 1996–2002; www.4qdtec.com/stpen.html; pp. 1–3.
Foreign Search Report dated Jul. 7, 2003, Documents Considered to be Relevant (1 pg.).
Torrens, Richard; "4QD–TEC; Electronics Circuits Reference Archive Stepper Motor As Encoder";4QD–TEC Circuits Archive; http://www.4qdtec.com/stpen.html, 2 pages.

* cited by examiner

Primary Examiner—Karen Masih
(74) Attorney, Agent, or Firm—David W. Boyd

(57) ABSTRACT

A motion control system comprises both a stepper motor and a DC motor. The motors are coupled, and may be operated independently or in concert for various scan types. The stepper motor may be used as an encoder for measuring the position of the mechanism.

16 Claims, 5 Drawing Sheets

US 6,756,749 B2

MOTION CONTROL SYSTEM INCLUDING BOTH A STEPPER MOTOR AND A DC MOTOR

FIELD OF THE INVENTION

The present invention relates generally to motion control systems.

BACKGROUND OF THE INVENTION

In the following discussion, an image scanner is used as an example of a system where the invention may be used, but the invention is applicable to many other motion control systems.

A scanner produces a digital representation of an original item. A variety of originals may be scanned, including documents, photographs, transparencies, or three-dimensional objects. The scanner maps locations on the original to memory locations, usually in a computer file.

The scanner typically sweeps a scanning mechanism near the original. The mechanism may contain a light source for illuminating the original, optical components for creating an image of the original, and sensors for converting the image to electronic signals. The scanning mechanism is typically actuated by a drive system that may include a motor, gears, belts, pulleys, cables, or other components.

Most often, one of two motor types is used. Many scanners use a stepper motor. A stepper motor moves its shaft angularly in response to the magnitudes and directions of currents in two or more winding phases. As the winding currents are changed, the motor shaft moves to different equilibrium positions, and thus the motor shaft position may be controlled by controlling timing, magnitudes, and directions of the winding currents. Stepper motors are often driven "open loop". That is, no measuring device is used to provide feedback as to the motor shaft position. As long as the motor is driven within its operating envelope, it can be counted on to move its shaft, and consequently the scanning mechanism, to the commanded positions. Stepper motors provide fine control of the scanning mechanism position, especially when reduction gears are used in the drive system, and thus can allow construction of scanners with very high resolutions. However, stepper motors often have a limited speed range over which they can operate. Using reduction gears to increase the scanning resolution further reduces the speed at which the scanner can operate with a given stepper motor.

Some scanners use a DC motor drive. A DC motor provides a torque in proportion to the current in its winding. It has no inherent positioning means, so an external position-measuring device is used, often an optical encoder. A controller, usually comprising a microprocessor, reads the motor or scan mechanism position and adjusts the motor winding current in such a way as to cause the scan mechanism to sweep through a series of desired positions at the proper times. DC motors may operate at substantial speeds, but the available encoders often cannot provide the resolution attainable with a stepper motor and reduction gears.

Speed and resolution are two important components of scanner performance. Both high speed and high resolution are desired, but these are often competing goals. It is desirable that a scanner be able to scan at high resolution when required and scan at high speed when required. Each motor type has a disadvantage in either speed or resolution.

There is a need for a motion control system that can both provide high resolution and scan at high speed.

SUMMARY OF THE INVENTION

A motion control system comprises both a stepper motor and a DC motor. The motors are coupled, and may be operated separately or in concert for various scan types. The stepper motor may be used as an encoder for measuring the position of the mechanism.

DETAILED DESCRIPTION OF THE PREFERRED EMBODIMENT

Figure 1:
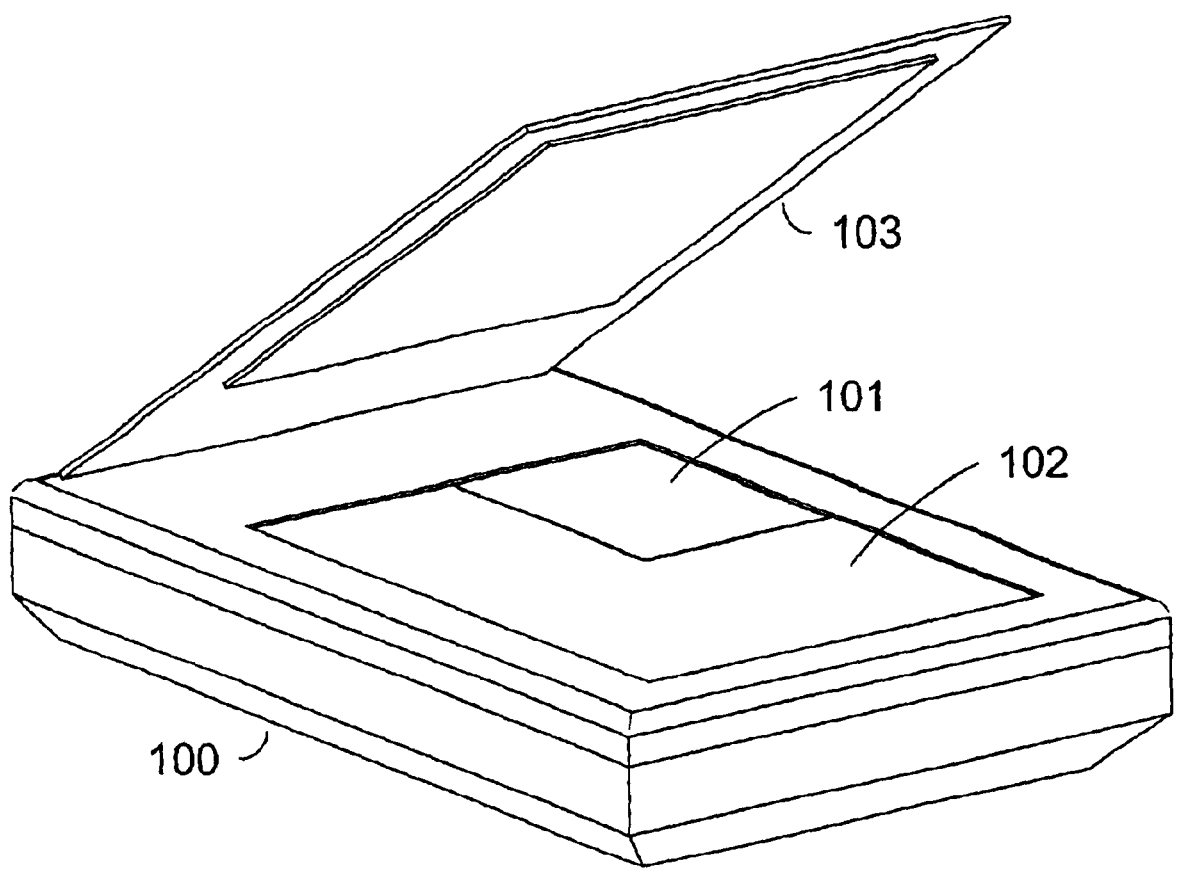
FIG. 1 is a drawing of a scanner.

FIG. 1 depicts a flatbed scanner (100) for creating digital representations of original items. A flatbed scanner is only one of several types of scanners that are available, and is used here for convenient illustration. The present invention may be used in other types of scanners as well, or in products or devices other than scanners. An original item (101) is placed on a platen (102) in position for scanning. During operation, a document cover (103) may be closed to hold the original (101) in place.

Figure 2:
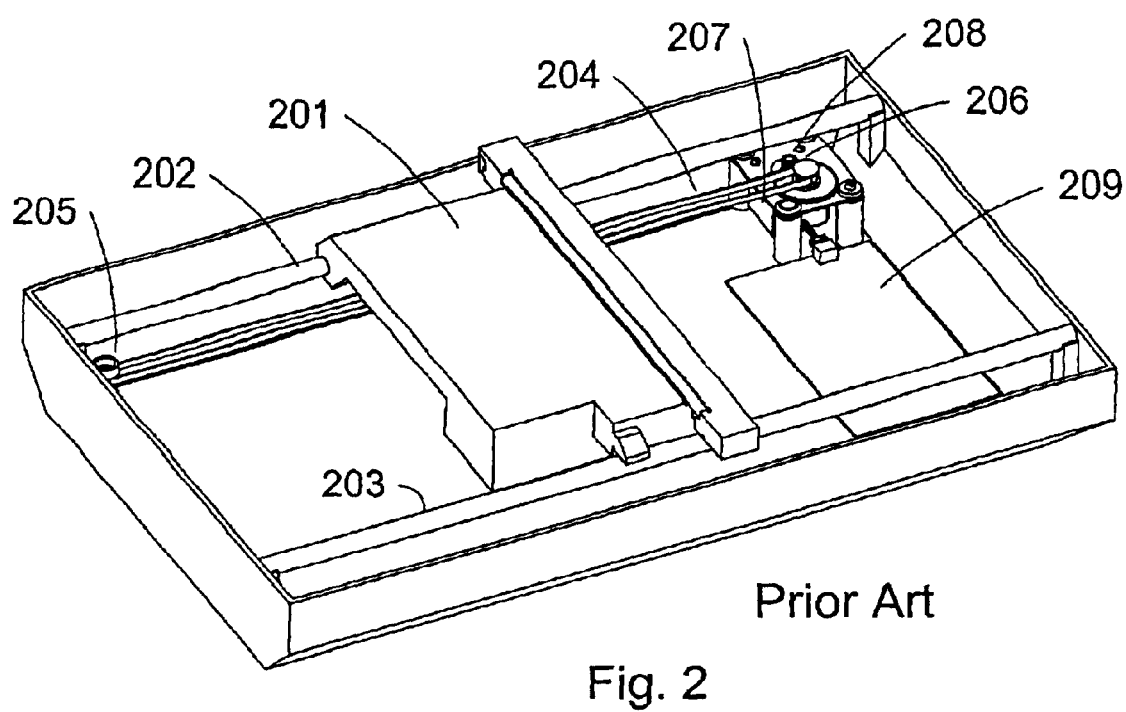
FIG. 2 (prior art) is a drawing of an open scanner showing the scanning mechanism.
Figure 2A:
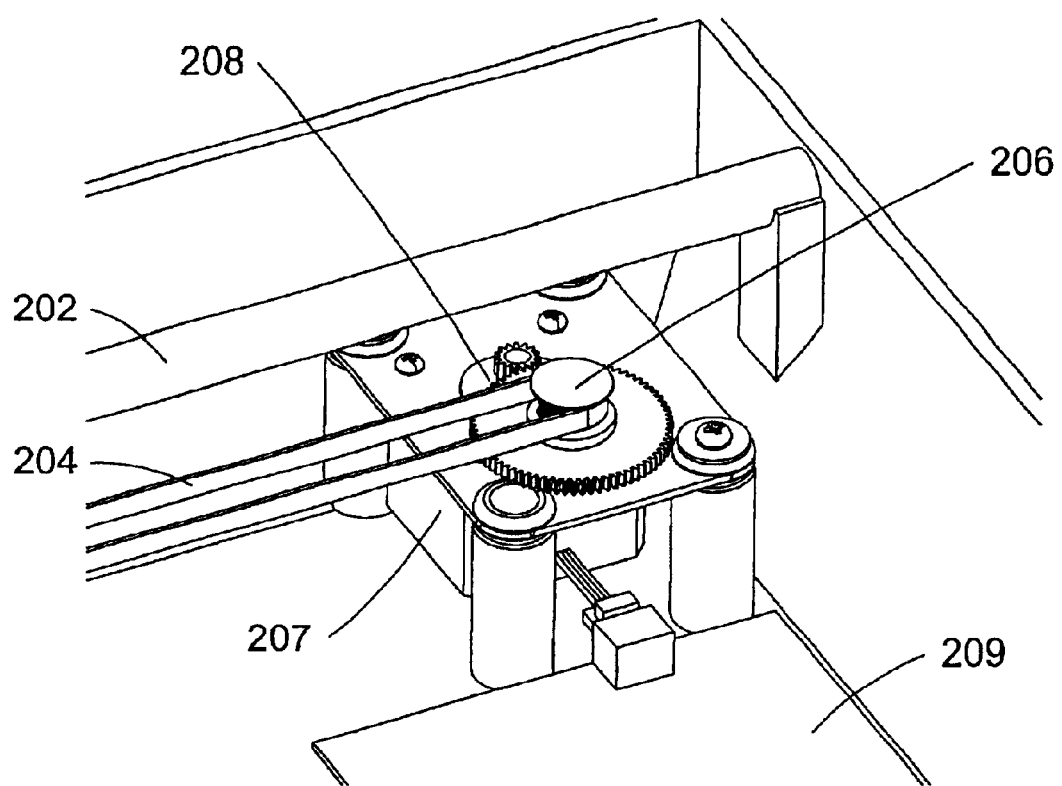
FIG. 2a (prior art) is a detail view of a part of FIG. 2.

FIG. 2 is a simplified internal view of a scanner (100). Scanning carriage (201) may contain a light source, optics, sensors, and other parts that are not shown individually. Scanning carriage (201) rides on guide rods (202, 203) and is moved by belt (204), which is guided by idler pulley (205) and driven by driver pulley (206). Driver pulley (206) is actuated by the motor (207) through gear set (208). Motor (207) is controlled by electronic control module (209), which may comprise a microprocessor system.

Many other scanner configurations are possible, and one of skill in the art will recognize that the present invention may be used in many other scanner designs or in other products or devices. For example, a sheet feed scanner holds the scanning elements stationary and moves the paper or other thin original past a scanning field. Relative motion between the scanning mechanism and the original may be achieved by moving either or both.

Figure 3:
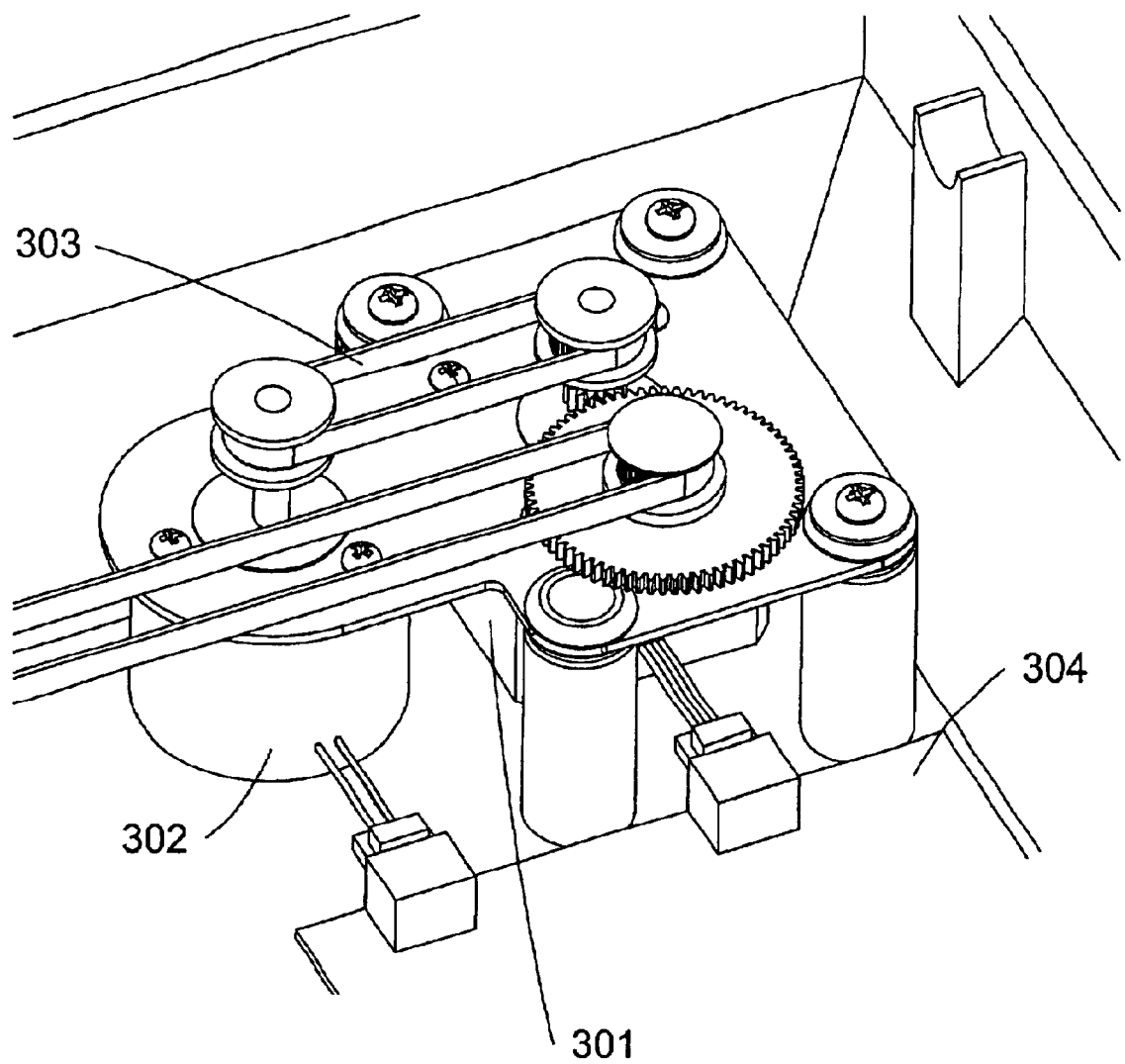
FIG. 3 is a partial drawing of an open scanner showing a scanning mechanism with two coupled motors, illustrating an example embodiment of the invention.

FIG. 3 is a partial view of a scanner that has a second motor (302) coupled to a first motor (301). In this illustration, first motor (301) is a stepper motor and second motor (302) is a DC motor, but other arrangements are possible. Second motor (302) is coupled to first motor (301) by belt (303). The motors could also be coupled using gears, cable drives, direct shaft coupling, or other methods. The coupling need not be such that the stepper motor and DC motor shafts turn equal angular distances. Other ratios may be used by the appropriate selection of gears, pulleys, capstans, or other elements. Electronic control module (304) is electrically connected to both motors.

Figure 4:
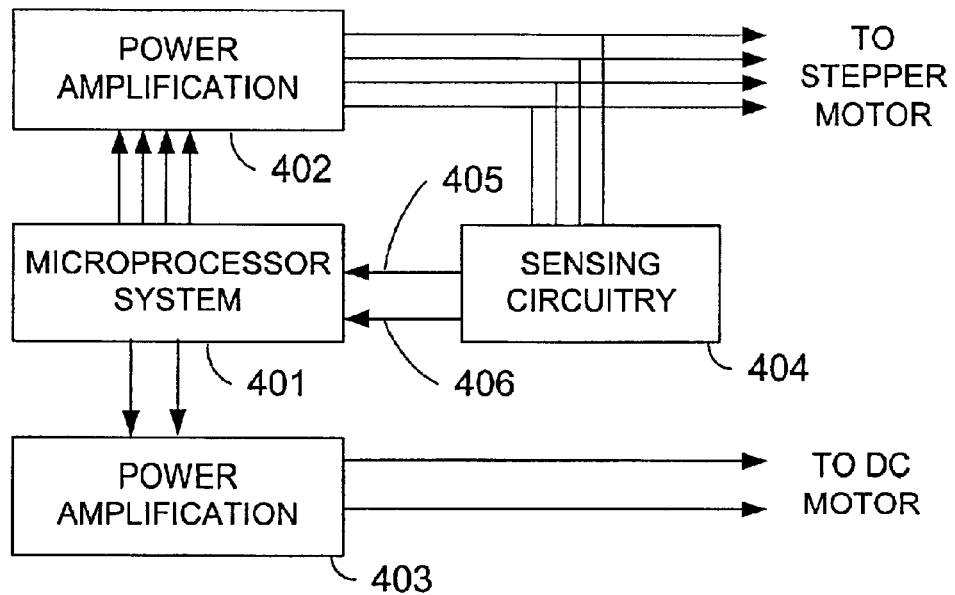
FIG. 4 is a simplified block diagram of an electronic control module for use with the example embodiment of FIG. 3.

FIG. 4 shows a simplified block diagram of electronic control module (304). Microprocessor system (401) controls the stepper motor (301) through power amplification circuit (402), and controls the DC motor (302) through a second power amplification circuit (403). Sensing circuitry (404) may optionally be present to enable certain operations.

This dual motor system may be operated in several modes. A first mode of operation may be used in situations where a stepper motor provides an advantage, for example, when the scanner is operating at high resolution and speed is not of primary importance. In this mode, the DC motor is shut off entirely and the stepper motor is the sole source of motive power in the system. A DC motor that is shut off presents little resistance to motion, and thus will not burden the stepper motor significantly. The additional inertia supplied by the DC motor may even provide beneficial damping to the stepper motor system.

In a second mode of operation, the DC motor may be used to assist the stepper motor. In this mode, the stepper motor is the primary motion controller and the correct position of the scanning mechanism is maintained by the proper timing of steps of the stepper motor. However, a stepper motor by its nature provides less torque at higher speeds. As the stepper motor rotates, it acts not only as a motor but also as a generator, and generates a voltage that serves to counteract the driving electronics. This voltage is known as back electromotive force, or "back EMF". The back EMF generated by the stepper motor increases with increasing speed, and at some point, diminishes the motor's power such that the motor can no longer overcome the mechanical load. This condition stalls the stepper motor and limits the speed at which it can operate in a given application.

In this second operating mode, the DC motor is energized such that it provides additional torque, in the appropriate direction, to the stepper motor. The additional torque is kept to a value small enough to prevent overrunning the stepper motor, which can cause the stepper motor to skip steps and position itself at a shaft position different than the commanded position. With this additional torque, the operating range of the stepper motor is extended, and thus the high-resolution capability of the motion control system is extended to higher speeds than would otherwise be possible.

In a third operating mode, the stepper motor is shut off and the DC motor is used as the sole source of motive power. The stepper motor is de-energized to reduce the parasitic load it presents to the DC motor. This third mode may be used where the DC motor provides an advantage, for example, when high speed is required. A DC motor may typically be capable of providing significant torque at a higher speed than a stepper motor. An encoder may be connected to the DC motor to provide motor position information to the microprocessor system (401), or alternatively, the stepper motor may be used as an encoder.

In this third mode, the stepper motor is being turned by the DC motor, and is thus generating back EMF. This back EMF appears on the lead wires of the stepper motor. Sensing circuitry (404) may sense the temporal pattern of the back EMF and make position-indicating signals (405, 406) available to the microprocessor system (401) that allow the microprocessor system (401) to track the position of the motors. In this way, the stepper motor can act as a position encoder, allowing the microprocessor system to accurately control the motion of the DC motor, and thus of the scanning mechanism.

Figure 5:
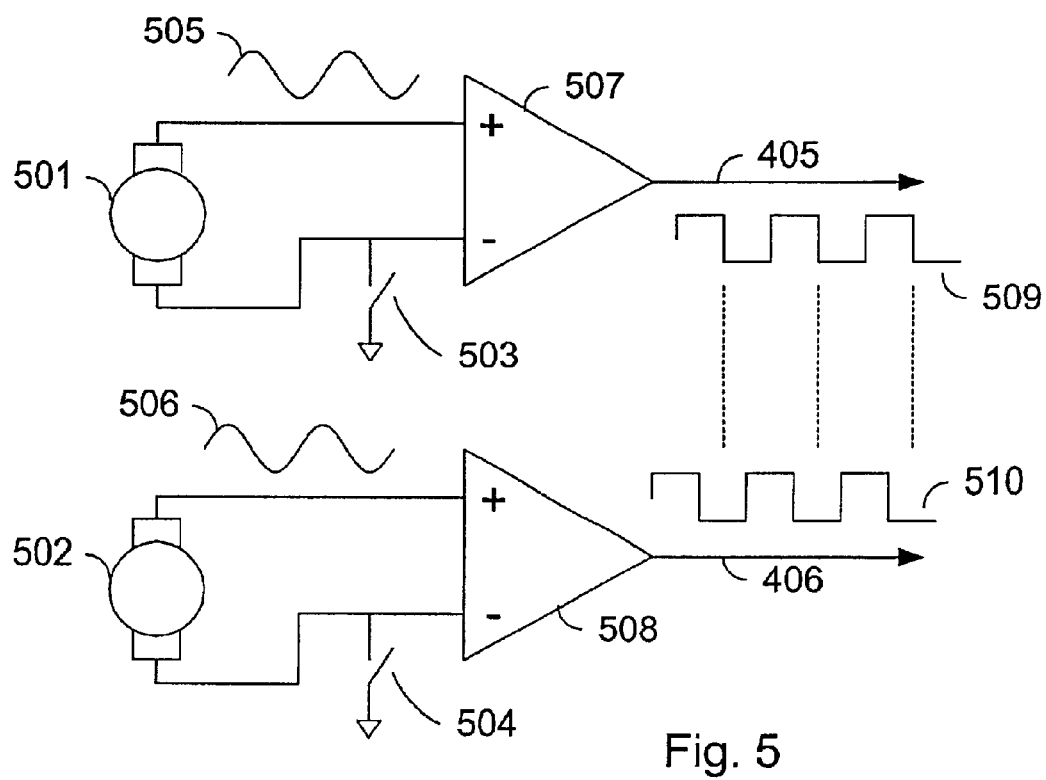
FIG. 5 is a schematic diagram of circuitry to sense the position of a stepper motor.

FIG. 5 schematically illustrates one possible configuration for the sensing circuitry. The stepper motor may be a two-phase motor, having windings (501) and (502). When the stepper motor is used as an encoder, any driving circuitry, typically a pair of H-bridges (not shown) is de-energized. Also during operation as an encoder, switches (503) and (504) may be closed to provide voltage references for the sensing circuitry. As the stepper motor is turned by the DC motor, each winding generates a substantially sinusoidal voltage (505, 506) in relation to ground. The two substantially sinusoidal patterns are shifted one quarter cycle in time relative to each other. These substantially sinusoidal voltages may be fed to comparators (507) and (508) which produce digital signals (509) and (510) corresponding to the substantially sinusoidal voltage signals (505) and (506). Digital waveforms (509) and (510) are also shifted by one quarter cycle in time relative to each other, and are similar to signals produced by an optical encoder.

In the encoder industry, such waveforms are described as quadrature waveforms. Decoder electronics are readily available for receiving quadrature waveforms and determining direction of movement and providing a count for each transition of each input waveform. Alternatively, decoding may be implemented within an application specific integrated circuit (ASIC). Alternatively, digital waveforms may be directly interfaced to the microprocessor system (401), which may interpret the motor position from them using a computer program.

The motor position information may be used by the microprocessor system (401) to control the DC motor speed and position using techniques that are also well known.

The foregoing description of the present invention has been presented for purposes of illustration and description. It is not intended to be exhaustive or to limit the invention to the precise form disclosed, and other modifications and variations may be possible in light of the above teachings. For example, the stepper motor need not be a two-phase motor. Stepper motors are available with other numbers of phases, and one of skill in the art will recognize that the invention may be applied using one of these motors as well. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A motion control system comprising:
   a) a stepper motor;
   b) a DC motor mechanically coupled to the stepper motor; and
   c) an electronic control module electrically connected to both motors for controlling both motors;
   and wherein the motion control system is operated with only one of the motors providing motive power and the other motor de-energized.

2. The motion control system of claim 1 wherein the system is operated with the stepper motor as the sole source of motive power and with the DC motor de-energized.

3. The motion control system of claim 1 wherein the system is operated with the DC motor as the sole source of motive power and with the stepper motor de-energized.

4. The motion control system of claim 1 further comprising circuitry that senses back EMF signals from the stepper motor and provides position-indicating signals to the electronic control module.

5. The motion control system of claim 4 wherein the system is operated with
   a) the DC motor as the sole source of motive power; and b) the stepper motor de-energized; and c) the sensing circuitry sensing the stepper motor back EMF and providing position-indicating signals to the electronic control module; and d) the electronic control module using the position-indicating signals to control the DC motor.

6. A scanner comprising:

a) a stepper motor;

b) a DC motor mechanically coupled to the stepper motor;

c) an electronic control module electrically connected to both motors for controlling both motors; and d) a scanning mechanism coupled to at least one of the motors;

and wherein the scanner is operated with only one of the motors providing motive power and the other motor de-energized.

7. The scanner of claim 6 wherein the scanner is operated with the stepper motor as the sole source of motive power and with the DC motor de-energized.

8. The scanner of claim 6 wherein the scanner is operated with the DC motor as the sole source of motive power and with the stepper motor de-energized.

9. The scanner of claim 6 further comprising circuitry that senses back EMP signals from the stepper motor and provides position-indicating signals to the electronic control module.

10. The scanner of claim 9 wherein the scanner is operated with:

a) the DC motor as the sole source of motive power; and b) the stepper motor de-energized; and c) the sensing circuitry sensing the stepper motor back EMF and providing position-indicating signals to the electronic control module; and d) the electronic control module using the position-indicating signals to control the DC motor.

11. A method of motion control comprising the steps of:

a) coupling a stepper motor mechanically to a DC motor; and b) energizing only one of the motors and controlling it using an electronic control module.

12. The method of claim 11 wherein the motor energized is the stepper motor.

13. The method of claim 11 wherein the motor energized is the DC motor.

14. The method of claim 13 further comprising the steps of:

a) sensing back EMF signals from the stepper motor using sensing circuitry; and b) determining the position of the motors from the back EMP signals; and c) controlling the DC motor based on the position.

15. A motion control system comprising:

a) a stepper motor;

b) a DC motor mechanically coupled to the stepper motor; and c) an electronic control module electrically connected to both motors for controlling both motors;

and wherein the motion control system is operated with only the stepper motor providing motive power and the DC motor de-energized when resolution is of primary importance;

and wherein the motion control system is operated with only the DC motor providing motive power and the stepper motor de-energized when speed is of primary importance.

16. A method of motion control, comprising:

a) coupling a stepper motor mechanically to a DC motor; and b) energizing only the stepper motor when resolution is of primary importance; and c) energizing only the DC motor when speed is of primary importance.

* * * * *